US005810305A

United States Patent [19]

Heard et al.

[11] Patent Number: 5,810,305

[45] Date of Patent: Sep. 22, 1998

[54] MOUNTING DEVICE FOR SECURING AN OBJECT TO A POST

[75] Inventors: Robert Arthur Henderson Heard, Backwell; Terence William Waite, Weston-Super-Mare, both of Great Britain

[73] Assignee: Signfix Limited, Upper Langford, England

[21] Appl. No.: 716,417

[22] PCT Filed: Mar. 21, 1995

[86] PCT No.: PCT/GB95/00621

§ 371 Date: Oct. 29, 1996

§ 102(e) Date: Oct. 29, 1996

[87] PCT Pub. No.: WO95/26020

PCT Pub. Date: Sep. 28, 1995

[30] Foreign Application Priority Data

Mar. 22, 1994 [GB] United Kingdom .................. 9405634

[51] Int. Cl.[6] .................................................. F16L 3/137

[52] U.S. Cl. .................................. 248/218.4; 248/225.11; 248/230.8; 248/73

[58] Field of Search .................................. 248/218.4, 73, 248/74.1, 74.3, 69, 316.1, 219.4, 220.22, 230.1, 300, 903, 223.41, 225.11, 230.8

[56] References Cited

U.S. PATENT DOCUMENTS

| | | | |
|---|---|---|---|
| 2,182,547 | 5/1939 | McCormick | 248/225.11 X |
| 2,972,461 | 2/1961 | Balbach et al. | 248/73 X |
| 3,185,419 | 5/1965 | Kindorf | 248/73 |
| 3,894,707 | 7/1975 | Heard | 248/225.11 X |
| 3,993,272 | 11/1976 | Lindeman | 248/73 |
| 4,066,233 | 1/1978 | Heard | 248/225.11 X |
| 4,125,240 | 11/1978 | Heard | 248/218.4 |
| 4,211,381 | 7/1980 | Heard | 248/225.11 X |
| 4,341,029 | 7/1982 | Heard | 248/230.8 X |
| 4,542,871 | 9/1985 | Fortsch | 248/73 |
| 5,732,915 | 3/1998 | Heard | 248/219.4 |

FOREIGN PATENT DOCUMENTS

| | | | |
|---|---|---|---|
| 1252412 | 11/1971 | United Kingdom | 248/218.4 |

*Primary Examiner*—Leslie A. Braun

*Assistant Examiner*—Stephen S. Wentsler

*Attorney, Agent, or Firm*—Larson & Taylor

[57] ABSTRACT

A mounting device (2) for securing an object to a post includes an abutment member (6) and an attachment member (4). The abutment member (6) has a face (7) adapted to seat against the post and arms (12) slotted to receive a resiliently flexible strap (10). The attachment member (4) is used for attachment to a channel member associated with the object. The channel member has a mouth restricted by inturned lips. The attachment member (4) also includes one or more substantially flat plate portions (24) for insertion into the channel member to be retained therein by the inturned lips and neck portions (26) to extend through the mouth of the channel leading to head portions (16) slotted to receive the resiliently flexible strap. In use, the strap is provided in the slots which are located such that at the points where the strap passes through the slotted head portions (16), the slot therein lies as close as, or closer to, the post than at the points where the strap passes through the slots of the arms (12). Preferably, the abutment member (6) is formed integrally with the attachment member (4).

10 Claims, 4 Drawing Sheets

MOUNTING DEVICE FOR SECURING AN OBJECT TO A POST

FIELD OF THE INVENTION

The present invention relates to mounting devices, and more particularly to mounting devices for use in securing an object, such as a sign, to a post.

BACKGROUND OF THE INVENTION

In an earlier patent, GB 1533412, a mounting device is disclosed comprising a saddle having a pair of opposite side members having shaped portions to seat against a post and a pair of separate attachment members loosely carried at opposite ends of the saddle between the two side members. Each attachment member is provided with a slotted head portion, connected to a stem portion, leading to an enlarged end portion lying beyond the saddle in a direction remote from the shaped portions of the side members. The rear of the object to be secured to the post is provided with a channel having a mouth with inturned lips.

In use, the object is attached to the post by inserting the enlarged ends of the attachment members into the channel, so as to engage under the inturned lips of the channel and passing strapping through the slots in their head portions. Flexing the strapping around the post and tightening it draws the saddle against the post and forces the enlarged ends of the attachment members to grip the lips of the channel, thereby fixing the sign to the post.

However, the mounting device described above comprises multiple parts that need to be assembled together to provide a device which is then used to fix a sign to a post. This can be inconvenient to assemble in the field. It is also found that as the above mounting device requires a relatively large number of operations to produce and comprises multiple parts, it is somewhat expensive to make. GB-A-2182547 discloses a bracket for attaching an article to a post. In one embodiment the bracket comprises a portion for insertion into a channel, having slotted heads to receive a flexible strap, and a separate portion for seating against a post. The portion arranged for seating against a post is made from three separate parts; a flat base, and two straps which are welded or otherwise secured to the base. These straps form tunnels through which the strap can pass. This embodiment suffers from the disadvantage that manufacture of the seating portion is relatively complex, involving four separate welds.

Another embodiment provides a three-part bracket in which a W-shaped portion is arranged for seating against a post, and a strap is passed through slots in an outer portion having a portion for insertion into a channel, and between the seating portion and a further plate. Assembly of this bracket requires interlocking of three separate components, and attachment to a post entails threading a strap between two separate moveable components in addition to through two slots on the outer component.

Thus, the brackets described in GB-A-2182547 suffer from similar drawbacks to those discussed above in relation to GB-A-1533412.

Accordingly, there is a need for a mounting device which is cheaper to manufacture and/or easier to use.

SUMMARY OF THE INVENTION

Accordingly, the present invention provides a mounting device for securing an object to a post comprising:

(a) an abutment member having a face adapted to seat against the post, and arms, the arms being slotted to receive a resiliently flexible strap; and, (b) an attachment member for attachment to a channel member associated with said object, the channel member having a mouth restricted by inturned lips, the attachment member comprising one or more substantially flat plate portions for insertion into the channel member to be retained therein by the inturned lips, and neck portions to extend through the mouth of the channel, the neck portions leading to head portions, the head portions being slotted to receive the resiliently flexible strap, wherein in use the strap at the points where it passes through the slotted head portions lies as close as, or closer to, the post than the points where it passes through the slots of the arms.

In one embodiment, the present invention provides a mounting device in which the attachment member and abutment member are formed integrally with each other, with the abutment member being linked to the attachment member via narrower neck portions. This means that each plate portion is bounded by one neck portion leading to the abutment member and one neck portion leading to a head portion. Preferably, there are two plate portions, making the mounting device generally W-shaped. The neck portions allow the mounting device to be inserted into the channel with the head portions and the abutment member protruding from the channel.

In a second embodiment, a mounting device having integrally formed abutment and attachment members is provided, in which the arms of the abutment member lead to one end of the head portions of the attachment member, with the plate portions for insertion into the channel being connected to the opposite end of the head portions by narrower neck portions. Thus, the plate portions are each connected via a single neck portion to a head portion.

In a third embodiment, the abutment member and attachment member are formed separately. In this case, the plate portion of the attachment member is bounded by the narrower neck portions which locate in recesses provided in flanges on the abutment member. Strapping can then be flexed through the slots in the attachment member and abutment member, retaining the two components together ready for use.

The mounting device can be punched out from sheet metal, eg stainless steel, and then folded into the appropriate conformation described above to produce the finished mounting device.

In use, a resiliently flexible strap can be passed through the slots in the arms and the slots in the head portions. The plate portion(s) can be slid into the channel attached to the rear of the object, to be retained there by the inturned lips. The strap can then be flexed around the post and tightened, eg with a suitable tensioning tool. This causes the face of the abutment member to be drawn against the post and the plate portion to engage and grip the lips of the channel.

Conveniently, the abutment member is shaped or formed to substantially match the shape of the post to which the object is attached. This can help to enhance the attachment of the object to the post.

Preferably, the mounting device is strengthened by being swaged (eg by transverse rib formations) or otherwise formed so as to increase its resistance to distortion when the strap is tightened or when the mounting device is under load. In particular, the plate portion can be swaged to increase its resistance to distortion by the inturned lips of the channel when the strap is tightened.

Preferably, the mounting device and the channel are made of materials of different hardness so that in use one of the mounting device and channel can bite into the other when the strap is tightened around the post. This is found to enhance the attachment of the mounting device to the channel. This may be accomplished by forming the neck portions so that they increase in width towards the plate portion, providing edges which can bite into the channel lips when the strap is tightened.

Additionally or alternatively, the plate portion is provided with teeth on its face which in use abut the inturned lips of the channel. The teeth are adapted to bite into the inturned lips when the strap is tightened, enhancing the attachment of the plate portion to the channel. The teeth are advantageously provided towards the ends of the plate portion adjacent to the narrower neck portions connecting the plate portion to the head portions. However, the extent to which the teeth can bite into the lips of the channel is limited by the substantially flat plate portion coming into abutment with the lips of the channel.

Preferably, the overall length of the plate portion(s) is less than the diameter of the post, more preferably less than equal to ⅔ of the diameter, and even more preferably less than or equal ½ the diameter of the post, whereby the strap contacts more than half of the circumference of the post. This helps the mounting device resist rotation about the post when it has been secured.

Preferably, the slots in the slotted portions of the attachment member in use are closer to the post than the slots provided in the arms of the abutment member. This helps to prevent the tightened strap being in a straight line as it passes through the mounting device and consequently not urging the attachment member towards the post.

BRIEF DESCRIPTION OF THE DRAWINGS

The present invention will now be further described with reference to the accompanying figures in which.

DETAILED DESCRIPTION

Figure 4:
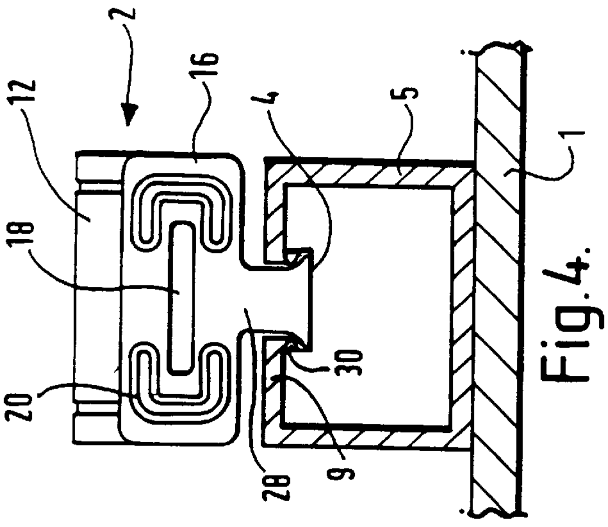
FIG. 4 shows an end view of the mounting device of FIG. 1 in position in a channel with the channel shown in cross-section.

Referring to the drawings, FIGS. 1 to 5 show a mounting device 2 for securing an object 1 to a post according to a first embodiment of the present invention having an abutment member 6 and an attachment member 4. The abutment member 6 comprises a face 7 having a shallow V-shape for seating against a post 8 and arms 12 provided with slots 14 to receive a resiliently flexible strap for fastening the device to the post.

The attachment member 4 is adapted for attachment to a channel member 5 provided on the object, the channel member 5 having a mouth restricted by inturned lips 9. The attachment member 4 comprises two substantially flat plate portions 24 for insertion into the channel to be retained therein by the inturned lips 9, the plate portions 24 being connected to the arms 12 of the abutment member 6 via narrower neck portions 26. The plate portions 24 are also bounded at their other ends by neck portions 28 connecting the slotted head portions 16 to the plate portions 24. The head portions 16 are directed towards the post and are provided with slots 18 to receive the strap 10.

Thus, the mounting device 2 can be formed as a single component, eg by punching out a blank from stainless steel and folding it into the conformation shown in the FIGS. 1 to 5. In this embodiment, the mounting device 2 can be made by folding the blank perpendicular to the longitudinal axis of the device, ie folds along the longitudinal axis are not required.

In use, the strap 10 is passed through the slots 18 in the head portions 16 and the slots 14 in the arms 12. The plate portions 24 are inserted into the channel and the strap 10 flexed around the post and tightened, eg with a suitable tensioning tool. This draws the face 7 against the post 8 and the plate portions 24 against the inside of the inturned lips of the channel. Fastening the strap 10 secures the object to the post.

Figure 2:
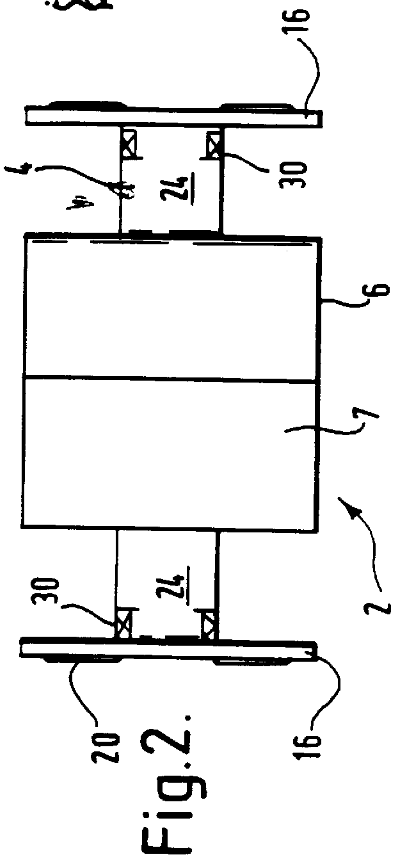
FIG. 2 shows a plan view of the device of FIG. 1.
Figure 3:
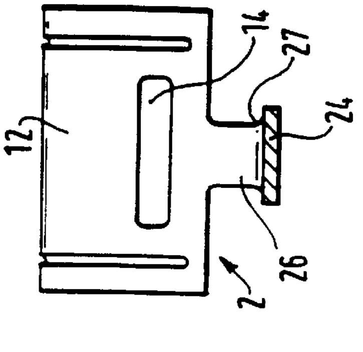
FIG. 3 shows a cross-section taken along line A—A of FIG. 1.

FIGS. 2 and 4 show how the mounting device can advantageously be strengthened by swagings 20 in the head portions 16 and in the abutment member 6. This allows the mounting device to be strengthened without substantially increasing its weight. It is also possible to swage the plate portions 24 to increase their resistance to distortion by the lips of the channel.

Figure 1:
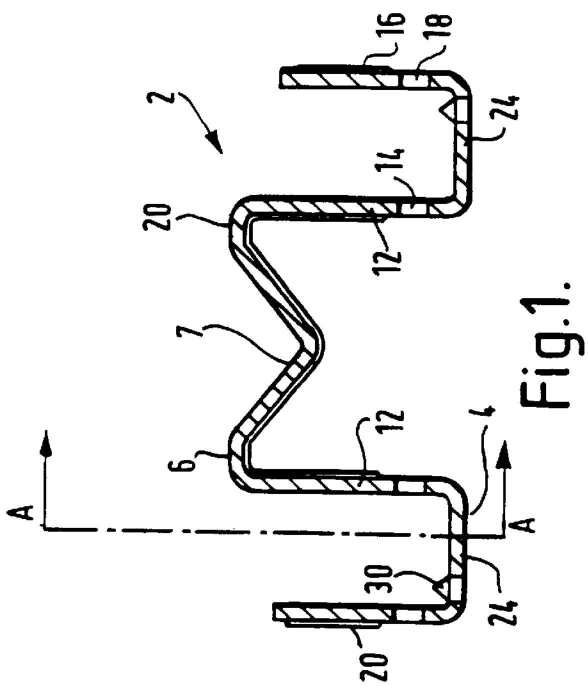
FIG. 1 shows a longitudinal cross-section through a mounting device of a first embodiment of the present invention.

FIGS. 1, 2 and 4 show how teeth 30 can be provided on the plate portions 24 to enhance the attachment between the mounting device and the channel 5. The teeth 30 are provided on the plate portions 24 so that when the strap 10 used to attach the mounting device 2 to the post is tightened, the teeth 30 bite into the inside of the inturned lips of the channel 5 (see FIG. 4). Additionally or alternatively, the neck portions 26 and/or 28 can be formed with radiused regions 27 to bite into the channel lips (see FIGS. 3, 4 and 6).

Figure 5:
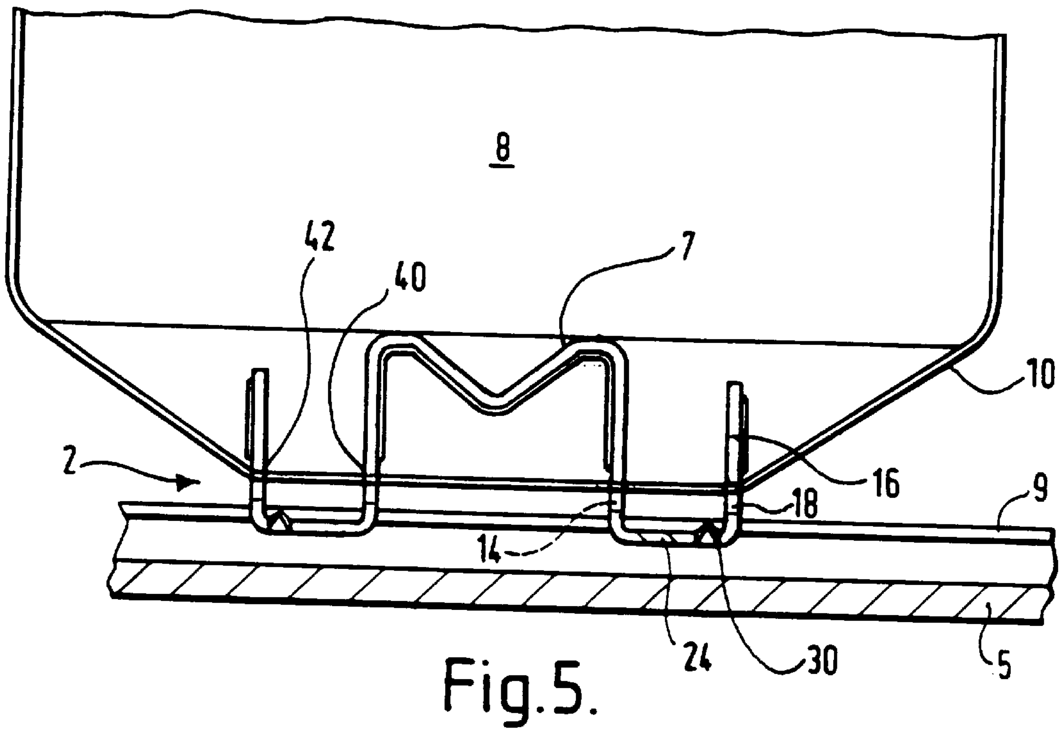
FIG. 5 shows the mounting device of FIGS. 1 to 4 in position on a post with the channel shown in cross-section.

FIG. 5 shows the mounting device in position on a square post 8. In use, the slots 14 and 18 are arranged relative to one another so that the points 40 at which the strap passes through the slots 14 lie no closer to, and preferably further from, the post 8 or seating plane therewith than the points 42 at which the strap passes through the slots 18. This ensures that tightening the strap 10 urges the device 2 towards the post 8.

Figure 6:
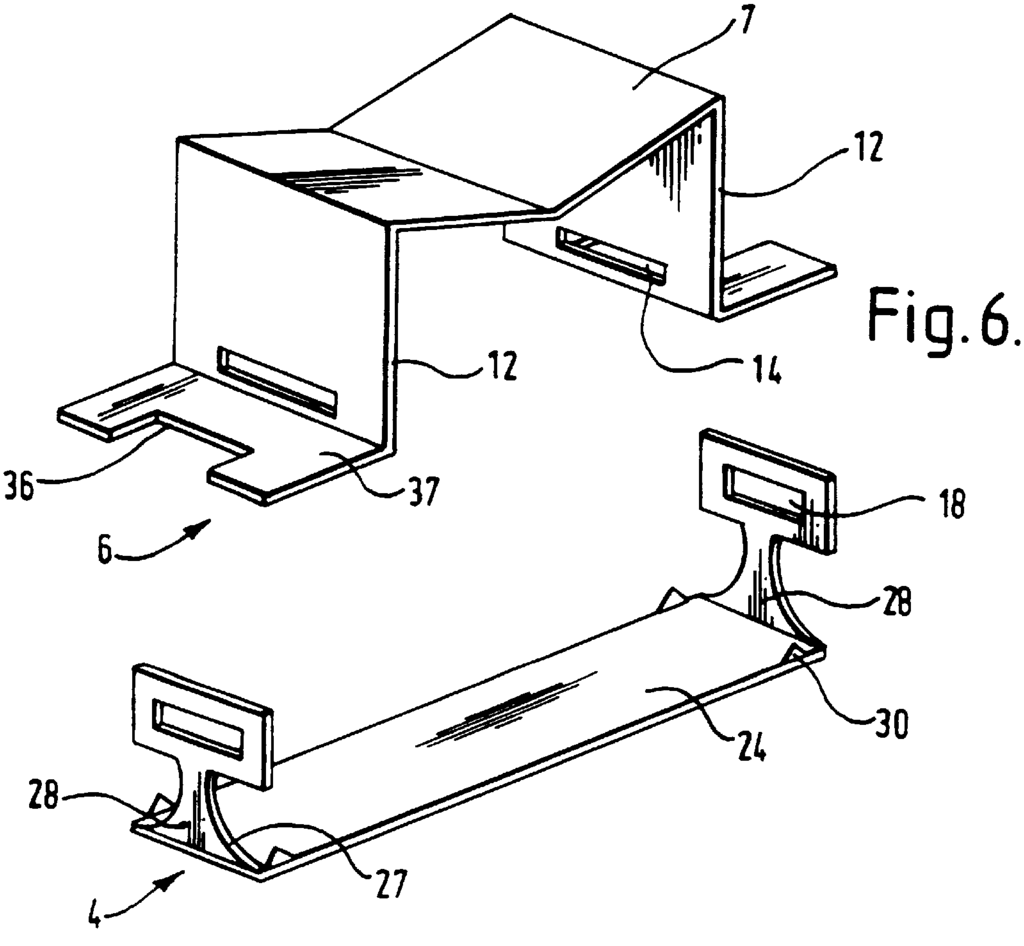
FIG. 6 shows an exploded view of a two-piece mounting device of a second embodiment of the present invention.
Figure 7:
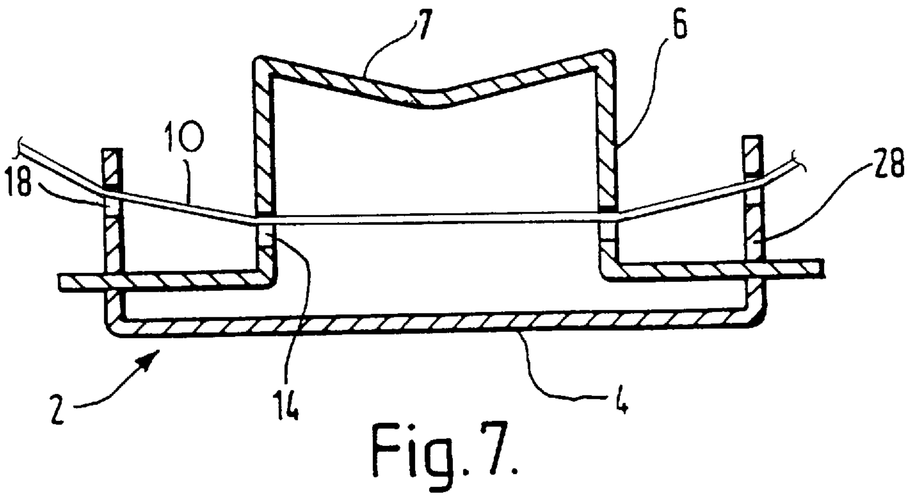
FIG. 7 shows a longitudinal cross-section through the mounting device of FIG. 6.

FIGS. 6 and 7 show a mounting device according to a second embodiment in which the attachment member 4 and abutment member 6 are separate components adapted to slot together. Thus, the attachment member 4 comprises a single plate portion 24 bounded by neck portions 28 and having teeth 30. The neck portions 28 connect the plate portion 24 to head portions 16, which are slotted to receive the strap.

The abutment member 6 comprises a face 7 for seating against a post and arms 12 extending away from the face 7. The arms 12 are provided with slots 14 and have recesses 36 formed in flanges 37 to receive the neck portions 28 of the attachment member 4. The mounting device 2 can be inserted into a channel (not shown) with the inturned lips of the channel retaining the plate portion 24. The recesses 36 of abutment member 6 engage the attachment member 4 by locating around neck portions 28. Thus, the abutment member 6 is not retained within the channel, rather between the channel and the post. FIG. 7 shows the two components 4,6 engaged together ready to receive strapping.

Figure 9:
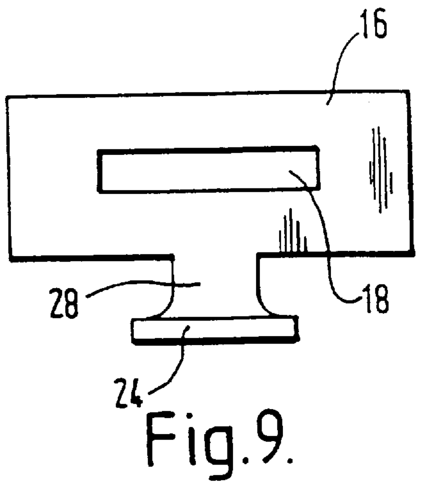
FIG. 9 shows an end view of the mounting device of FIG. 8.
Figure 8:
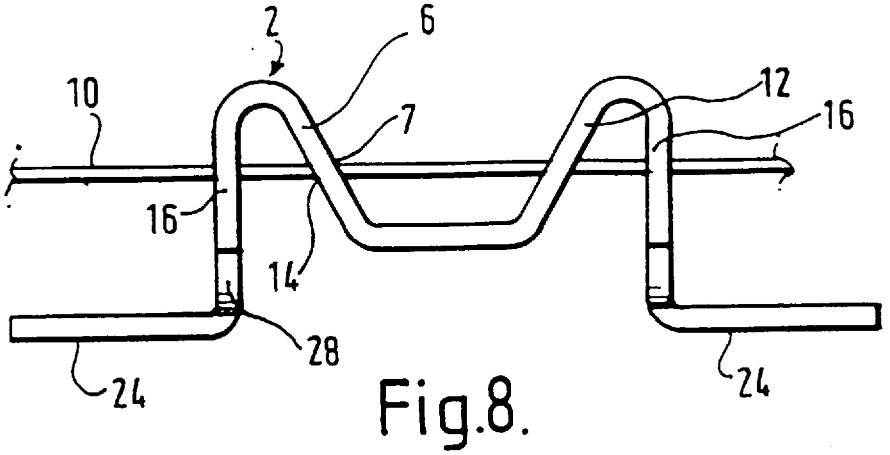
FIG. 8 shows a longitudinal cross-section through a mounting device according to a third embodiment of the invention.

FIGS. 8 and 9 show a mounting device according to a third embodiment of the invention. In this embodiment, the abutment member 6 has a face 7 having a flattened V-shape for seating against a post. The arms 12 extend away from the post, connecting to head portions 16 also slotted with slots 18 to receive strapping, and the head portions are provided with narrower neck portions 28. The neck portions 28 connect to plate portions 24, which extend in mutually opposite directions away from the center of the abutment member 6.

In use, strapping 10 is threaded through the slots 14,18 in the arms 12 and head portions 16. The strapping passes between the arms 12 and is therefore trapped between the device 2 and the post. The arrangement of plate portions 24 means that when the strapping 10 is tightened, it tends to urge the plate portions 24 against the inturned lips of the channel, thereby causing the mounting device 2 to grip the object.

FIGS. 10 to 14 show a mounting device 2 which is a generally similar to the mounting device shown in FIGS. 1 to 5. This mounting device 2 has an abutment member 6 having a face 7 which includes a flat portion 44. When strapping 10 is threaded through slots 14,18 provided in the arms 12 and the head portions 16, and is flexed around the post, the strapping acts against the flat portion 44, urging the mounting device into contact with the post when the strapping 10 is tightened (see FIG. 13).

The arms 12 of the device are also provided with inturned lugs 48. The lugs 48 are arranged so that when the plate portions 24 are retained in place by the inturned lips 9 of the channel member 5 attached to an object, the lugs 48 rest on the outer surface of the lips 9 of the channel, increasing the surface of the mounting device 2 that bears against the channel 5 from that side. This helps to spread the load on the channel when the strapping 10 is tightened, helping to prevent the channel distorting.

Figures 10, 11, 12, 13, 14:
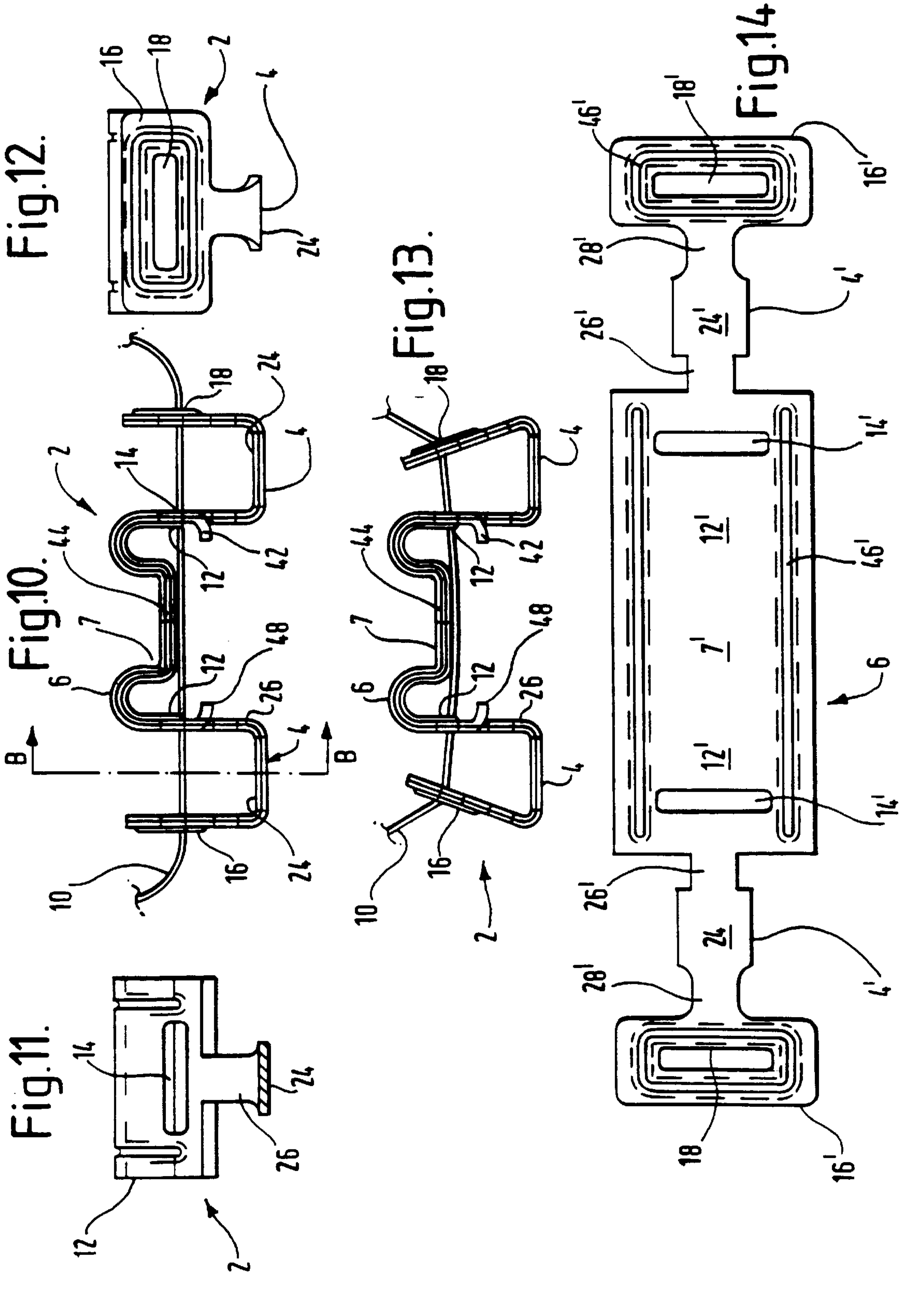
FIG. 10 shows a longitudinal cross-section through a further mounting device of a first embodiment of the invention.
FIG. 11 shows a cross-section taken along line B—B of FIG. 10.
FIG. 12 shows an end view of the mounting device of FIG. 10.
FIG. 13 shows a longitudinal cross-section through the device of FIGS. 10 to 12 showing the device when the strapping has been tightened; and, FIG. 14 shows a blank suitable for folding into the device of FIGS. 10 to 12.

FIG. 13 show the effect of tightening the strapping 10 to secure the mounting device 2 and object against the post. This causes the head portions 16 to be flexed inwardly and towards the post so that their slots 18 lie closer to the post than the slots 14 provided on the arms 12. This helps to urge the mounting device against the post.

FIG. 14 shows a blank, eg pressed out from sheet metal, suitable for forming in the mounting device 2 of FIGS. 10 to 13. This figure shows an abutment member forming panel 6' and an attachment member forming panel 4'. The abutment member forming panel 6' comprises a face forming panel 7' and arms 12', the arms 12' being provided with slots 14'.

The attachment member forming panel 4' comprises two substantially flat plate forming portions 24' leading to the arms 12' of the abutment member forming panel 6' via narrower neck portions 26'. The plate forming portions 24' are also bounded at their other ends by neck portions 28' connecting the slotted head forming portions 16'. The head forming portions 16' are provided with slots 18'. This figure also shows how the face forming panel 7' and the head forming panels 16' can be strengthened by swaging 46', to increase the resistance of the finished mounting device to distortion when it is under load.

In this case, the mounting device can be folded into conformation by only making folds that are substantially perpendicular to the longitudinal axis of the device.

We claim:

1. A mounting device for securing an object to a post with a resiliently flexible strap, the object having a channel member associated therewith which channel member has a mouth restricted by inturned lips, said mounting device comprising:

an abutment member having a face adapted to seat against the post along a seating plane, and arms formed from sheet material, said arms being substantially planar and extending away from the seating plane and having (i) a first surface, (ii) a second surface opposite to said first surface, and (iii) arm slots extending through each of the substantially planar arms from said first surface to said second surface which said arm slots are adapted to receive the flexible strap; and an attachment member for attachment to the channel member, said attachment member including one or more substantially flat plate portions which are adapted for insertion into the channel member to be retained therein by the inturned lips thereof, neck portions extending away from said one or more plate portions towards the seating plane which said neck portions are adapted to pass through the mouth of the channel member, and respective head portions joined to said one or more plate portions by said neck portions and having head slots therethrough adapted to receive the flexible strap, said head portions being located by the flexible strap so that said slotted arms of said abutment member are disposed therebetween.

2. A mounting device according to claim 1 wherein in use the strap at points where it passes through the head slots lies as close as, or closer to, the seating plane than points where it passes through the arm slots.

3. A device according to claim 1 wherein the abutment member has a spaced pair of said arms with the arm slots in register, and the attachment member has a spaced pair of said head portions with the head slots in register; wherein a spacing of the head portions exceeds that of the arms; and wherein, in use, (a) the arms extend between the head portions, and (b) a portion of a strap path of the strap between the head portions is displaced away from the seating plane of the face of the abutment member relative to a straight line between said head slots.

4. A mounting device according to claim 1 wherein the attachment member and abutment member are formed integrally with each other as one part.

5. A mounting device according to claim 1 wherein the abutment member connects to the plate portions via said neck portions so that each said plate portion is bounded by one said neck portion leading to the abutment member and one said neck portion leading to a respective said head portion.

6. A mounting device according to claim 1 wherein each said arm of the abutment member leads to one end of a respective said head portion of the attachment member, with the plate portions being connected to an opposite end of the head portions by said neck portions.

7. A mounting device according to claim 1 wherein the abutment member and the attachment member are formed separately, with the plate portion of the attachment member being bounded by the neck portions which locate in recesses provided in flanges on the abutment member.

8. A mounting device according to claim 1 wherein the mounting device is strengthened by being swaged so as to increase its resistance to distortion.

9. A mounting device according to claim 1 wherein the mounting device is made of a material capable of having a different hardness than that of the channel so that in use one of the mounting device and channel can bite into the other when the strap is tightened around the post.

10. A mounting device according to claim 1 wherein the neck portions increase in width towards the plate portions, providing edges which can bite into the channel lips when the strap is tightened.

* * * * *